No. 678,892.　　　　　　　　　　　　　　Patented July 23, 1901.
J. C. MILLER.
APPARATUS FOR STERILIZING LIQUIDS.
(Application filed May 16, 1900.)
(No Model.)　　　　　　　　　　　　　　2 Sheets—Sheet 1.
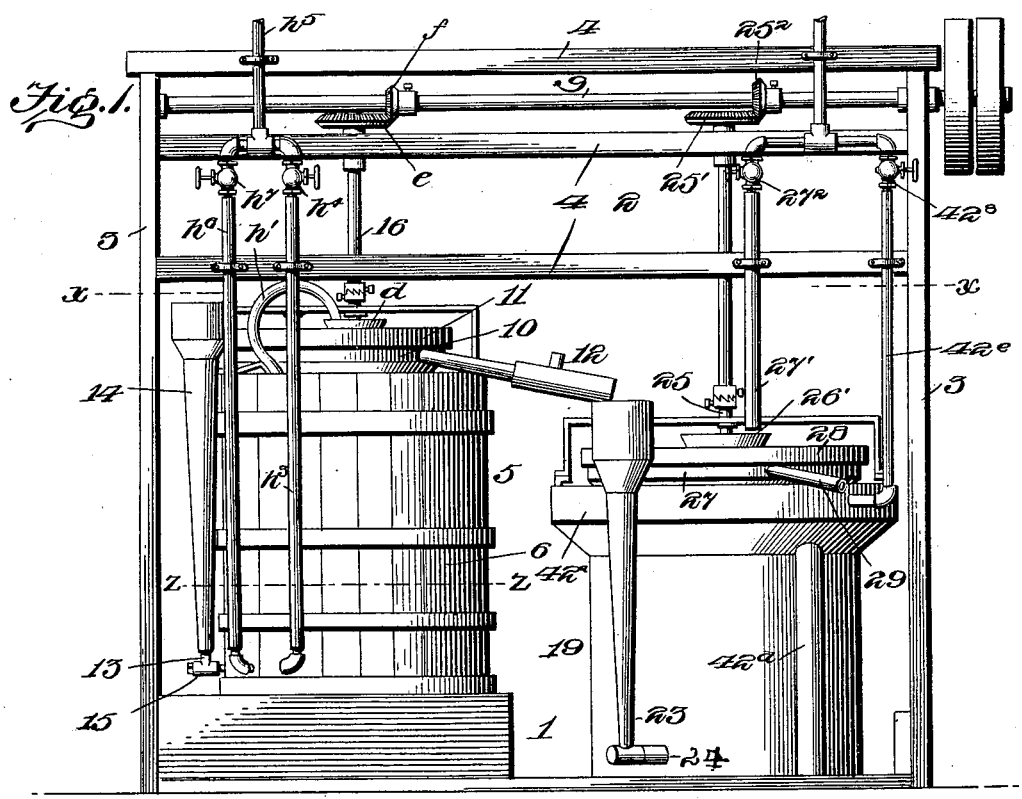

No. 678,892. Patented July 23, 1901.
J. C. MILLER.
APPARATUS FOR STERILIZING LIQUIDS.
(Application filed May 16, 1900.)
(No Model.) 2 Sheets—Sheet 2.
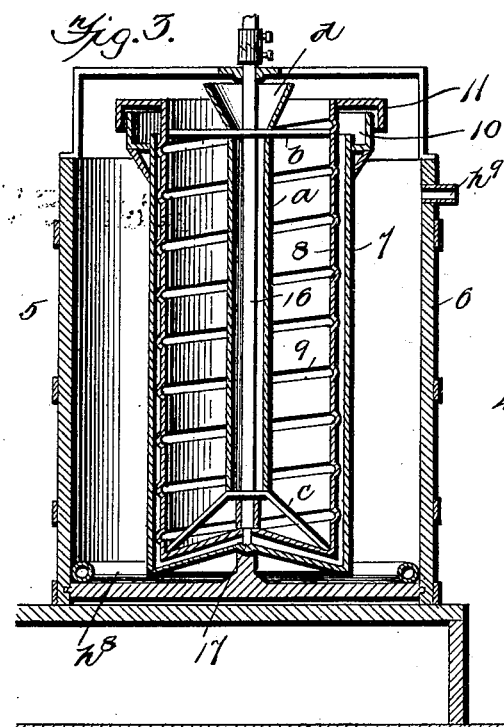
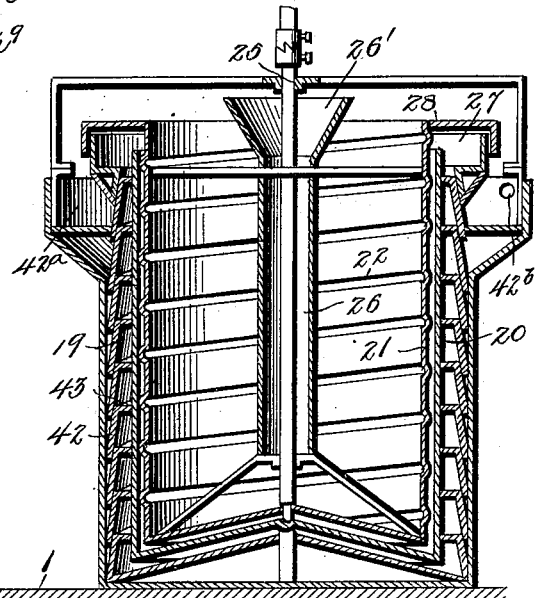
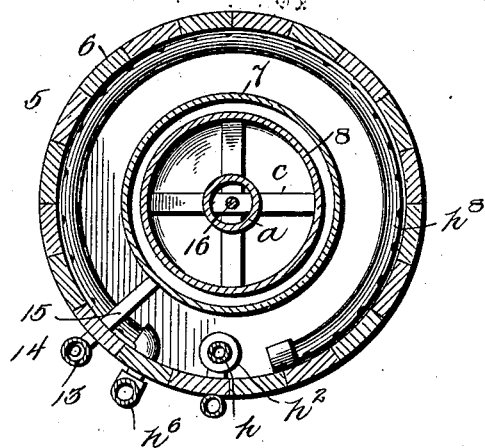
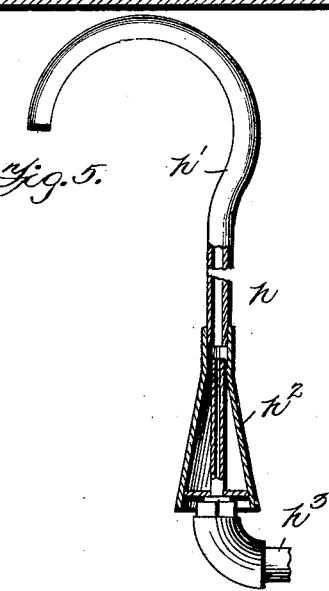
J. C. Miller Inventor

UNITED STATES PATENT OFFICE.

JOHN C. MILLER, OF CANTON, OHIO, ASSIGNOR TO JACOB H. MILLER, OF SAME PLACE.

APPARATUS FOR STERILIZING LIQUIDS.

SPECIFICATION forming part of Letters Patent No. 678,892, dated July 23, 1901.

Application filed May 16, 1900. Serial No. 16,854. (No model.)

*To all whom it may concern:*

Be it known that I, JOHN C. MILLER, a citizen of the United States, residing at Canton, in the county of Stark and State of Ohio, have invented certain new and useful Improvements in Apparatus for Sterilizing Liquids; and I do declare the following to be a full, clear, and exact description of the invention, such as will enable others skilled in the art to which it appertains to make and use the same.

The invention relates to a new and improved apparatus for sterilizing and cooling liquids, and more particularly to an apparatus for treating milk to destroy bacteria and germs and to remove therefrom obnoxious odors and tastes, all of which may be accomplished without imparting to the milk a cooked taste, which is generally noticeable in milk sterilized by other processes and means, and, furthermore, without destroying the cream-giving properties of the milk, whereby the cream may be skimmed from the milk sterilized by my process the same as if the sterilization had not taken place.

The object of the invention is to improve the construction shown and described in my application for patent, Serial No. 739,469, filed December 7, 1899.

The invention consists, broadly, in raising the temperature of the milk to a point below the boiling-point—say, for instance, to 168° or 170° Fahrenheit—keeping the milk in constant motion and in an attenuated stream while being subjected to a high temperature, then feeding the milk from the sterilizer to a cooler, before entering which it is subjected to the air to liberate from it all obnoxious and disagreeable fumes and gases.

The invention also consists in certain other steps, which will be hereinafter described and claimed.

In the accompanying drawings, Figure 1 is a side elevation of an apparatus for carrying out my improved process. Fig. 2 is a transverse horizontal section on the line $xx$ of Fig. 1. Fig. 3 is a longitudinal vertical sectional view on line $yy$ of Fig. 2. Fig. 4 is a horizontal sectional view on the line $zz$ of Fig. 1; and Fig. 5 is a side elevation, partly in section, of the steam or hot-water injector.

Referring to said drawings, 1 denotes the supporting-bed, and 2 the gear-frame, the latter consisting of vertical standards 3, connected by cross-bars 4.

5 denotes the sterilizer, which consists of the tub 6, which incloses two cylinders 7 and 8, the latter being inclosed within the former and formed with a helical corrugation 9, which throughout its entire length engages the inner wall of the cylinder 7 and forms a feed-screw. The upper end of the cylinder 7 is provided with an annular trough 10, while the upper end of the cylinder 8 is provided with an overhanging annular shield or flange 11, which prevents the liquid fed upward by the corrugation 9 being thrown out of the trough and also prevents the steam or hot water becoming mixed with said liquid. 12 denotes a pipe or conveyer which leads from said trough and communicates with the cooler hereinafter described.

13 denotes a supply-pipe, the upper end of which is provided with a funnel 14, into which the liquid is adapted to be fed, and the lower end of which communicates with a transverse pipe 15, which communicates with the bottom of the cylinder 7 and is adapted to supply the liquid to said cylinder below the bottom of the cylinder 8.

$a$ denotes a vertical tube arranged centrally within the cylinder 8 and secured thereto by braces $b$ and $c$. Each end of this tube is open, and the upper end is provided with a funnel $d$.

16 denotes a shaft fixed in the bottom of the cylinder 8 and having its lower end stepped in a bearing 17, formed in the bottom of the cylinder 7. This shaft is adapted to be rotated in any suitable manner, preferably by providing it with a gear $e$, which meshes with a gear $f$, fixed to the drive-shaft $g$, and will impart a rotary movement to the cylinder 8 to feed the liquid in the bottom of the cylinder 7 upward into the through 10. Steam or hot water is adapted to be injected into the cylinder 8 to raise the temperature of the liquid as it is being fed upward in an attenuated stream from the bottom of the cylinder 7 and between the cylinders 7 and 8 by the helical rib or feed-screw, whereby the liquid under treatment will be thoroughly sterilized.

To maintain an equal temperature around the outside of the cylinder 7 and the inside of the cylinder 8, and thereby subject all particles of the liquid to a uniform temperature, I provide an injector $h$, which I locate between the tub 6 and the outer cylinder 7. This injector consists of a tube $h'$, the upper end of which is bent over the funnel $d$ to direct the steam and hot water into said funnel. The lower end of the tube is flared, as shown at $h^2$, and projecting within this flared end is a steam or hot-water pipe $h^3$, controlled by a cock $h^4$ and connected at its upper end to the main steam-pipe $h^5$. A second steam-pipe $h^6$, provided with a controlling-cock $h^7$, projects through the tub 6 and is connected with a perforated coil $h^8$, which is arranged within the tub at the bottom thereof.

When the machine is in operation, the hot water is fed into the tub and entirely surrounds the cylinder 7. The cock $h^4$ is now opened and the injector put into action. The hot water is now drawn from the tub by the injector and fed into the funnel $d$, and passing down the centrally-disposed vertical pipe is discharged into the cylinder 8 at the bottom thereof. It will thus be seen that the cylinders 7 and 8 will be kept at the same temperature, so that the milk being fed between said cylinders will have a uniform temperature. If desired, the tub may be provided with an overflow-pipe $h^9$.

After the liquid has been thoroughly sterilized it is desirable to cool the same or reduce it to a low temperature, by doing which it is found that the cooked taste so objectionable in sterilized liquids is entirely removed and the sudden subjection of the liquid to a lower temperature entirely destroys any germs or bacteria which may be in the liquid. It is essential in transferring the liquid from the sterilizer to the cooler to pass it through the air or vent it, so as to permit of the escape of the obnoxious fumes and gases. The manner of accomplishing this will soon appear from the following description:

The cooler hereinbefore referred to consists of a tub or casing 19 and the cylinders 20 and 21. Within the tub 19 and within the cylinder 21 is adapted to be placed a cooling agent, such as cold water, or, if desired, I may use cold water in the tub and cold water and ice in the cylinder 21. The inner cylinder 21 is provided with a helical corrugated feed-screw 22, which coacts with the interior wall of the cylinder 20 to feed the liquid under treatment upwardly in a like manner as in the description of the sterilizer.

The conductor-pipe 12 extends from the trough of the sterilizer to a feed-pipe 23, which communicates with a pipe 24, which leads to the space between the cylinders 20 and 21 and conveys the liquid from the sterilizer to said space. As the liquid is discharged from the pipe 12 into the pipe 23 it is subjected to the atmosphere, and the gases and fumes separated from said liquid by the action of the sterilizer are liberated, so that the liquid when admitted to the cooler is freed from such fumes and gases and is in condition to have any bacteria or germs therein destroyed by the shock incident to the sudden changing of the temperature of the liquid. The cylinder 21 is provided with a shaft 25 for rotating it, and this shaft is provided with a gear-wheel $25'$, meshing with a gear $25^2$, fixed to the drive-shaft. The cylinder is also provided with a centrally-disposed tube 26, open at each end and having at its upper end a funnel $26'$. Through this funnel is adapted to be passed cold water from a pipe $27'$, provided with a stop-cock $27^2$. The upper end of the cylinder 20 is provided with a trough 27, while the upper end of the cylinder 21 is provided with an overhanging flange or shield 28.

29 denotes a discharge-pipe leading from the trough 27 to a point where the liquid is to be bottled or stored.

The cylinder 20 of the cooler is preferably provided with a spiral strip 42, having a continuous flange 43 to form a spiral chamber, and is provided at its upper end with a trough $42^a$, having an outlet-pipe $42^b$ near its upper edge and may be inclosed within the casing 19. The tub at its lower end communicates with a vertically-disposed external pipe $42^d$, which leads upwardly and communicates with the trough $42^a$.

A cold-water pipe $42^e$, provided with a stop-cock $42^8$, extends through the trough $42^a$ and communicates with the upper end of the tub. The ice if used as a cooling agent is placed within the cylinder 21 and the water turned on and discharged from its respective pipes $27'$ and $42^e$. The water discharging from the former pipe enters the flange of the vertically-disposed tube and is discharged at the bottom of the inner cylinder and flows upward over the funnel or shield 28 and empties into the trough $42^a$ and escapes through the escape-pipe $42^b$. The water entering the outer cylinder passes in a tortuous stream around the same until it reaches the lower end of the cylinder, from whence it escapes into the vertical pipe $42^d$ and is led to the trough $42^a$ and discharged therefrom through the escape-pipe $42^b$.

From the foregoing description, taken in connection with the accompanying drawings, it is believed that the apparatus will be fully understood without requiring an extended explanation. It may be well to lay stress upon the fact that the process carried out by this apparatus, which process is made the subject-matter of a separate application, filed May 10, 1900, Serial No. 16,218, is a continuous one and that there are no periods of rest, thereby enabling me to operate the machine without waste of time, which is common to machines used for similar purposes, wherein after the liquid under treatment has been raised to a certain temperature it is held to that temperature for a certain period before it is passed to the cooler, thus necessitating a halt in the process, and consequently reducing the capacity of the machine. By my apparatus the liquid under treatment is fed to the sterilizer in a continuous stream and flows from the cooler in a like manner thoroughly sterilized.

Having thus described my invention, what I claim, and desire to secure by Letters Patent of the United States, is—

1. In an apparatus of the character described, the combination with a sterilizer comprising a tub, two cylinders placed within the tub one within the other, one of said cylinders being provided with a feed-screw which works against the other cylinder, of a steam or hot-water pipe located within the tub exterior to the cylinders, and an injector located in the tub to eject the water therefrom and inject it into the innermost cylinder whereby a uniform temperature is maintained between the two cylinders, substantially as set forth.

2. In an apparatus of the character described, the combination with a sterilizer comprising a tub and two cylinders placed within the tub one within the other, one of said cylinders being provided with a feed-screw which works against the other cylinder, of a steam or hot-water pipe located within the tub exterior to the cylinders, and an ejector located in the tub to eject the water therefrom and inject it into the innermost cylinder whereby a uniform temperature is maintained between the two cylinders, substantially as set forth.

3. In an apparatus of the character described, the combination with a sterilizer comprising a tub and two cylinders placed within the tub one within the other, of a steam or hot-water discharge-pipe located in the bottom of the tub exterior to the cylinders, and an injector leading from the tub to the innermost cylinder, substantially as set forth.

4. In an apparatus of the character described, the combination with a sterilizer comprising a tub and two cylinders placed within the tub one within the other, of a steam or hot-water coil located in the bottom of the tub exterior to the cylinders, a vertical pipe extending downwardly and in close proximity to the bottom of the innermost cylinder, and an injector leading from the tub and adapted to discharge into the vertically-disposed pipe within the cylinder, substantially as set forth.

5. In an apparatus of the character described, the combination with a sterilizer comprising a tub and two cylinders placed within the tub one within the other, of an air-inlet pipe located in the bottom of the tub, and means for maintaining a continuous circulation of water between the tub and innermost cylinder, substantially as set forth.

6. The combination of a cooler comprising an inner and outer cylinder, the inner cylinder being provided with a feed-screw to engage the inner wall of the outer cylinder, the outer cylinder being provided with an external tortuous water-passage and with an upper trough which communicates with the space formed between the two cylinders, and the inner cylinder being provided with a lateral flange or guard extending over said trough, a second trough arranged around the outer cylinder and extending laterally beyond the first-named trough and adapted to receive the overflow from the inner cylinder, a water-pipe communicating with the inner cylinder and the tortuous passage of the outer cylinder, a pipe communicating with the lower end of the tortuous passage and the last-named trough, substantially as set forth.

In testimony whereof I have hereunto set my hand in the presence of two subscribing witnesses.

JOHN C. MILLER.

Witnesses:
SAML. A. DRURY,
E. F. CAVERLY.

It is hereby certified that in Letters Patent No. 678,892, granted July 23, 1901, upon the application of John C. Miller, of Canton, Ohio, for an improvement in "Apparatus for Sterilizing Liquids," an error appears in the printed specification requiring correction, as follows: In line 55, page 3, the word "air" and the hyphen following it should be stricken out; and that the said Letters Patent should be read with this correction therein that the same may conform to the record of the case in the Patent Office.

Signed, countersigned, and sealed this 6th day of August, A. D., 1901.

[SEAL.]

F. L. CAMPBELL,
*Assistant Secretary of the Interior.*

Countersigned:
    E. B. MOORE,
        *Acting Commissioner of Patents.*